Aug. 25, 1964  R. B. CRONHEIM  3,145,743
HARD-BOILED EGG CUTTER
Filed April 4, 1962  2 Sheets-Sheet 1
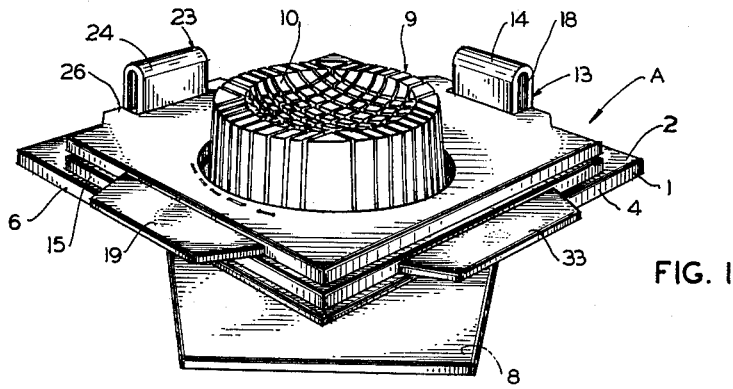
FIG. 1
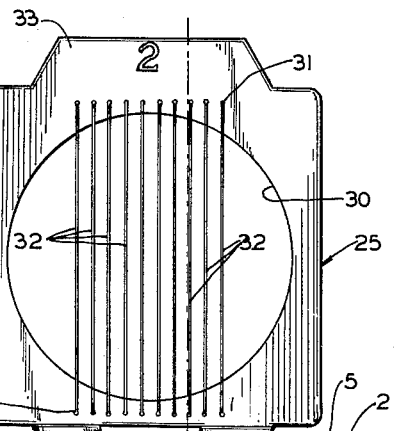
FIG. 2
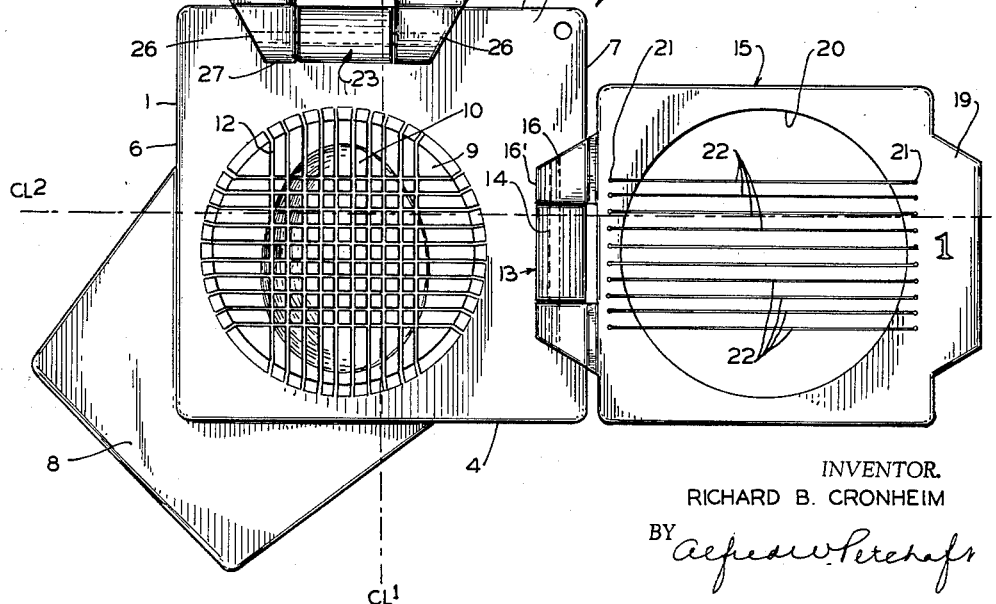
INVENTOR.
RICHARD B. CRONHEIM
BY
ATTORNEY Aug. 25, 1964 R. B. CRONHEIM 3,145,743
HARD-BOILED EGG CUTTER
Filed April 4, 1962 2 Sheets-Sheet 2

INVENTOR.
RICHARD B. CRONHEIM
BY
ATTORNEY

United States Patent Office 3,145,743
Patented Aug. 25, 1964

3,145,743
HARD-BOILED EGG CUTTER
Richard E. Cronheim, 411 N. 7th St., St. Louis 1, Mo.
Filed Apr. 4, 1962, Ser. No. 185,032
3 Claims. (Cl. 146—2)

This invention relates in general to kitchen utensils and, more particularly, to an improved type of egg cutter.

It is a common practice in the preparation of many food dishes, such as salads and similar mixed vegetable items, to incorporate sliced hard-boiled eggs. The cutting or slicing of various fruits and vegetables which are inherently rigid in nature, such as apples, carrots, and the like, present no serious difficulty. However, the cutting or slicing of hard-boiled eggs is usually a rather difficult and time-consuming operation. Generally, the housewife or cook will cut up the egg by using a paring knife and making a series of longitudinal slits and a series of lateral slits, thus forming a plurality of more or less cubical egg particles.

Mechanical egg cutters heretofore used have been rather ineffective, however, since a hard-boiled egg, when sliced in one direction, tends thereafter to slip and slide when subjected to transverse cutting forces. Moreover, such cutters tend to mash and deform the egg in the cutting operation, since the egg, even though hard-boiled, is rather flexible, soft, and frangible.

It is, therefore, the primary object of the present invention to provide an egg cutter which is capable of slicing eggs to maintain uniformly sized and shaped pieces.

It is another object of the present invention to provide an egg cutter of the type stated which eliminates most of the waste usually incurred with devices of this type.

It is also an object of the present invention to provide an egg cutter of the type stated which is light in weight, rigid in construction, and economical to manufacture.

It is an additional object of the present invention to provide an egg cutter of the type stated which can be produced in a variety of colors to conform to a general decorative household scheme.

With the above and other objects in view, my invention resides in the novel features of form, construction, arrangement, and combination of parts presently described and pointed out in the claims.

In the accompanying drawings (two sheets)—

FIG. 1 is a perspective view of an egg cutter constructed in accordance with and embodying the present invention;

FIG. 2 is a top plan view of the egg cutter of FIG. 1 showing both of the cutting frames forming a part of the present invention pivoted to an open position;

Figure 3:
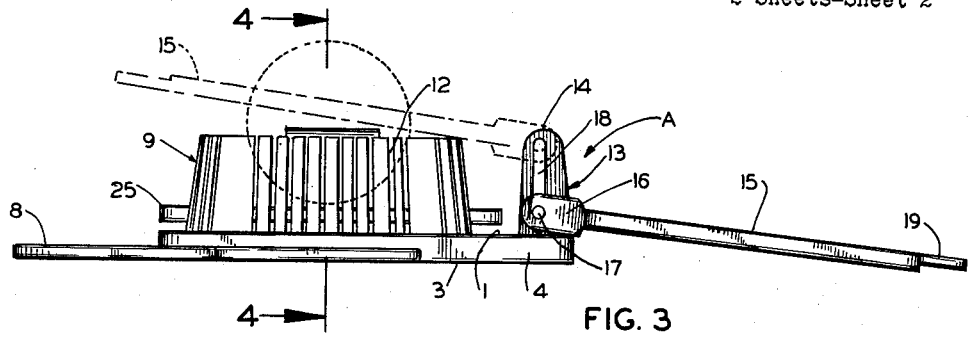
FIG. 3 is a front elevational view of the egg cutter with one of the cutting frames pivoted to an open position.

Referring now in more detail and by reference characters to the drawings, which illustrate a preferred embodiment of the present invention, A designates an egg cutter preferably formed of aluminum or other light-weight metal, and comprising a rectilinear base 1, having an upwardly presented surface 2, an under surface 3, a front wall 4 and a back wall 5 mutually connected at their transverse margins by transverse side walls 6, 7. Integrally formed with the base 1 and extending angularly outward from the front wall 4 and the transverse side wall 6 is a handle 8, all as can best be seen in FIG. 2.

Integrally formed with, and extending upwardly from, the base 1 is an egg support 9 which is provided with a somewhat elliptically-shaped recess 10 having a size to accommodate a standard shelled egg. The egg support 9 is longitudinally grooved (reference being made to FIG. 2, that is in the direction of vertical planes which are perpendicular to the transverse end walls 6, 7), to provide a series of parallel slicing or cutting grooves 11. The egg support 9 is further provided with a series of transverse slicing or cutting grooves 12 which lie in vertical planes that are perpendicular to the longitudinal slicing grooves 11.

Figure 5:
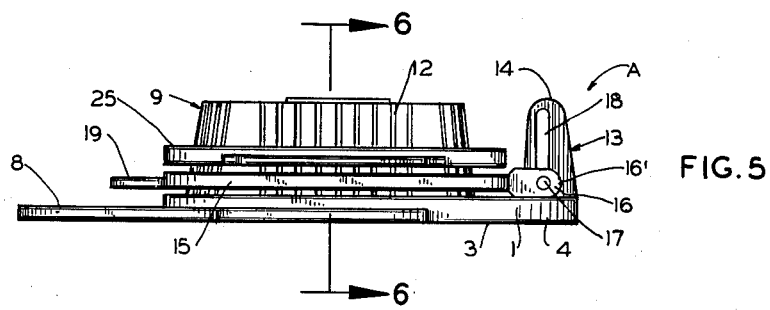
FIG. 5 is a front elevational view of the egg dicer of FIG. 1 showing both of the cutting frames in the closed position.

Integrally formed with and extending upwardly from the base 1 adjacent the end wall 7 is a hinge 13 having an upper rounded end 14 and pivotally mounted thereon is a first swingable cutting frame 15 which is provided with a pair of spaced projecting hinge flanges 16 having rounded ends 16'. Mounted in, and extending between, each of the flanges 16 is a pivot pin 17 which is vertically shiftable in an elongated slot 18 formed within the hinge 13. Integrally formed with, and extending outwardly from, the outer margin of the cutting frame 15 (reference being made to FIG. 2) is a tab or flange 19 of reduced thickness which serves as a means to grasp the cutting frame 15 and swing the same to an open position (as shown in FIG. 2) or to a closed position (as shown in FIG. 5). The cutting frame 15 is provided with a large circular aperture 20 having a diametral size slightly larger than the diametral size of the egg support 9. Formed along portions of the peripheral margin of the aperture 20 are spaced opposed threading holes 21 which are designed to accommodate a cutting wire 22 which is threaded longitudinally across the aperture 20 in the manner as shown in FIG. 2. The distance between each of the convolutions of the cutting wire 22 is equal to the distance between two of the longitudinal grooves 11, the grooves 11 further being spaced to accommodate the longitudinal convolutions of the cutting wire 22 when the cutting frame 15 is pivoted to the closed position. The tab 19 is further imprinted with or stamped on its upper and lower surfaces with the number "1," indicating the first cutting frame.

Figure 4:
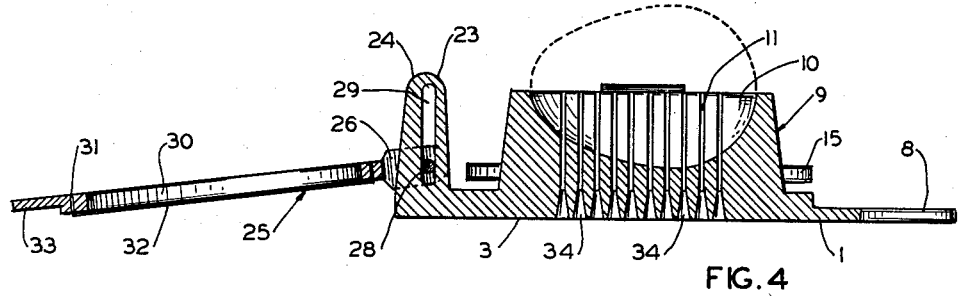
FIG. 4 is a vertical sectional view taken along line 4—4 of FIG. 3.

Integrally formed with, and extending upwardly from, the base 1 at its rearward margin is a hinge-support 23 having an upper rounded end 24, and mounted thereon is a second cutting frame 25, having a pair of spaced opposed hinge flanges 26 which are provided with rounded ends 27. Mounted in, and extending between, each of the hinge flanges 26 is a pivot pin 28 which is vertically shiftable in an elongated slot 29 formed within the hinge 23, thus permitting the cutting frame 25 to be pivoted from an open position (that is the position as shown in FIG. 4), to a closed position (that is the position as shown in FIG. 5). By reference to FIGS. 3 and 4, it can be seen that the elongated slots 18 and 29 are substantially of the same length as the egg support 9, and the slot 29 is slightly larger than the slot 18, the differential of size being approximately equal to the thickness of the first cutting frame 15. The cutting frame 25 is provided with a large circular cutting aperture 30 which has a diametral size slightly larger than the diametral size of the egg support 9 and which is provided with pairs of spaced opposed threading apertures 31 along portions of its peripheral margin for accommodating a cutting wire 32 which is threaded between each of the pairs of apertures 31 in the manner as shown in FIG. 2. The spacing between the convolutions of the cutting wire 32 is approximately equal to the distance between each of the transverse slots 12, and, moreover, the convolutions of the cutting wire 32 are located to lie with the transverse grooves 12 when the cutting frame 25 is moved to the closed position as shown in FIG. 5. Integrally formed with, and extending outwardly from, the outer margin of the cutting frame 25 is a tab or flange 33 of reduced thickness, which serves as a means to grasp the cutting frame 25 when pivoting the same to either open or closed position. The tab 33 is imprinted on its upper and lower surfaces with the numeral "2" to designate the second cutting frame.

By reference to FIGS. 1 and 2, it can be seen that the geometric center of the egg support 9 is located to the left of a transverse centerline $CL^1$ of the base and is located forwardly of a longitudinal centerline $CL^2$ of the base 1. It should also be noted that the hinge 13 and the longitudinal centerline of the aperture 20 is located forwardly of the longitudinal centerline $CL^2$ and the hinge 23 and the transverse centerline of the aperture 30 is located to the left of the transverse centerline $CL^1$, all as can best be seen in FIG. 2.

After the cutting operations are completed, scraps or cuttings from the cut pieces of the eggs usually become wedged in the lower portions in the grooves 11, 12. Therefore, the base 1 is preferably drilled from its underface 3 at the point of intersection of each of the longitudinal grooves 11 and the transverse grooves 12 to provide a series of inwardly tapering rinsing apertures 34. The base 1 is further provided with an aperture 35 for accommodating a conventional hook (not shown), whereby the cutter A can suitably be hung.

In use, the cutting frames 15 and 25 are pivoted to their open position as shown in FIG. 2. An egg, shown in dotted lines in FIGS. 3 and 4, which has been previously cooked and shelled, is then placed in the recess 10 of the egg support 9. The first cutting frame 15 is then pivoted to a position where the convolutions of the cutting wire 22 will rest upon the upper surface of the egg and thereby shift the pivot pin 17 to its uppermost position within the slot 18, substantially as shown in FIG. 3. At this juncture, it is to be noted that the rounded ends 16' of the flanges 16 bear against the upper surface 2 and aid in urging the pivot pin 17 upwardly within the slot 18. Next, the second cutting frame 26 is then pivoted to a position where it rests on the upper surface of the cutting frame 15. The rounded ends 27 of the hinge flanges 26 will aid in urging the pivot pin 28 to its uppermost position within the elongated slot 29.

Figure 6:
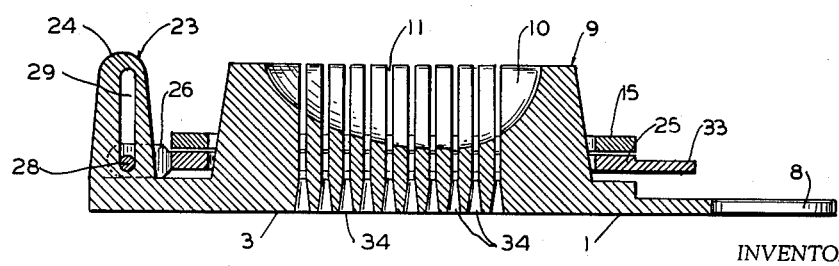
FIG. 6 is a vertical sectional view taken along line 6—6 of FIG. 5.

Thereupon, both of the tabs 19, 33, are pressed downwardly so that the cutting wires 22, 32, will slice the egg into neat and regularly cut dices. The frames 15 and 25 are then urged to their closed position as shown in FIGS. 5 and 6 where the cutting wires 22 are disposed within the longitudinal grooves 11 and the cutting wires 32 are disposed within the transverse grooves 12. In this connection, it is to be noted that, as the pivot pins 17, 28, are raised to a position where they lie in a plane which passes through the center portion of the egg, a downward force directed on the tabs 19, 33, will tend to have an almost nearly vertical component of force on the entire frames 15 and 25, thereby eliminating any horizontal component of force which may tend to force the egg off of the egg support 9. In this connection, it is also noted that the recess 10 aids in maintaining the egg in a rigid position on the egg support 9.

It should also be understood that the cutting frames 15 and 25 may be operated independently so that the first cutting frame is moved from an open to closed position in a first operation and the second cutting frame is then moved from its open to closed position, cutting the egg in a second operation. After the cutting operation is completed, the egg cutter A can be turned over and inserted under a tap of water so that rinsing water will flush through the apertures 34 and cleanse the lower portions of the grooves 11, 12, of any remnants of egg which may have accumulated therein.

It should be understood that any changes and modifications in the form, construction, arrangement, and combination of parts of the egg cutter may be made and substituted for those herein shown and described without departing from the nature and principle of my invention.

Having thus described my invention, what I claim and desire to secure by Letters Patent is:

1. An egg cutter comprising a base, an egg support mounted on said base, first hinge means operatively mounted on said base and having an elongated groove, a first cutter mounted on said first hinge means and having an element which is shiftable in said elongated groove, second hinge means operatively mounted on said base and having an elongated groove, and a second cutter mounted on said second hinge means, said second cutter having an element which is shiftable in the elongated groove of said second hinge means, said first and second elongated grooves extending from the lower margins of the first and second hinge means to a point wherein their upper ends are located approximately in the same horizontal plane which passes through the approximate center of an egg which is to be cut, said first and second cutters being capable of being shifted to cutting position when the elements are disposed at the upper ends of the first and second grooves at the initiation of the cutting operation.

2. An egg cutter comprising a base, an egg support mounted on said base, first hinge means operatively mounted on said base and having an elongated groove, a first cutter mounted on said first hinge means, a pair of projecting flanges formed with said first cutter, an element extending between said flanges and being shiftable in said elongated groove, second hinge means operatively mounted on said base and having an elongated groove, a second cutter mounted on said second hinge means, a pair of projecting flanges formed with said second cutter, and an element extending between the latter named pair of flanges and being shiftable in the elongated grooves of said second hinge means, said first and second elongated grooves extending from the lower margins of the first and second hinge means to a point wherein their upper ends are located approximately in the same horizontal plane which passes through the approximate center of an egg which is to be cut, said first and second cutters being capable of being shifted to cutting position when the elements are disposed at the upper ends of the first and second grooves at the initiation of the cutting operation.

3. An egg cutter comprising a base, an egg support mounted on said base, first hinge means operatively mounted on said base and having an elongated groove, a first cutter mounted on said first hinge means, a pair of projecting flanges formed with said first cutter, an element extending between said flanges and being shiftable in said elongated groove, second hinge means operatively mounted on said base and having an elongated groove, a second cutter mounted on said second hinge means, a pair of projecting flanges formed with said second cutter, and an element extending between the latter named pair of flanges and being shiftable in the elongated grooves of said second hinge means, said first and second elongated grooves extending from the lower margins of the first and second hinge means to a point wherein their upper ends are located approximately in the same horizontal plane which passes through the approximate center of an egg which is to be cut, the pairs of flanges on said first and second cutters having rounded outer ends, said first and second cutters being capable of being shifted to cutting position when the elements are disposed at the upper ends of the first and second grooves at the initiation of the cutting operation.

References Cited in the file of this patent

UNITED STATES PATENTS

| | | |
|---|---|---|
| 1,379,724 | Russell | May 31, 1921 |
| 2,073,257 | Van Ripper | Mar. 9, 1937 |
| 2,240,221 | Locker | Apr. 29, 1941 |

FOREIGN PATENTS

| | | |
|---|---|---|
| 11,620 | Great Britain | 1899 |